(12) United States Patent
Takita et al.

(10) Patent No.: US 8,380,077 B2
(45) Date of Patent: Feb. 19, 2013

(54) CHROMATIC DISPERSION COMPENSATION DESIGN SYSTEM AND CHROMATIC DISPERSION COMPENSATION DESIGN METHOD

(75) Inventors: Yutaka Takita, Kawasaki (JP); Toru Katagiri, Kawasaki (JP); Kazuyuki Tajima, Kawasaki (JP); Tomohiro Hashiguchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 632 days.

(21) Appl. No.: 12/562,799

(22) Filed: Sep. 18, 2009

(65) Prior Publication Data
US 2010/0080556 A1 Apr. 1, 2010

(30) Foreign Application Priority Data
Sep. 26, 2008 (JP) .................. 2008-247165

(51) Int. Cl.
*H04B 10/12* (2006.01)
(52) U.S. Cl. .......... 398/147; 398/81
(58) Field of Classification Search ........... 398/81, 398/147
See application file for complete search history.

(56) References Cited

U.S. PATENT DOCUMENTS

| 7,382,979 B2* | 6/2008 | Akiyama et al. ........... 398/25 |
| 2005/0185967 A1* | 8/2005 | Hoshida .................. 398/173 |
| 2006/0193638 A1 | 8/2006 | Akiyama et al. |

FOREIGN PATENT DOCUMENTS

| JP | 2005-318474 A | 11/2005 |
| WO | WO-2005/006604 | 1/2005 |

* cited by examiner

*Primary Examiner* — Danny Leung
(74) *Attorney, Agent, or Firm* — Fujitsu Patent Center

(57) ABSTRACT

A chromatic dispersion compensation design system includes: an input unit that inputs information of an optical network having a plurality of nodes optically coupled to each other via an optical transmission path; an allowable range determining unit that determines an allowable range of a residual chromatic dispersion with respect to every wavelength path of a plurality of signals from a starting node to a terminal node, based on the information of the optical network; and a calculation unit that calculates a wavelength path capacity in the allowable range of the residual chromatic dispersion, in view of a chromatic dispersion variability of each optical element in the optical network.

10 Claims, 4 Drawing Sheets

CHROMATIC DISPERSION COMPENSATION DESIGN SYSTEM AND CHROMATIC DISPERSION COMPENSATION DESIGN METHOD

CROSS-REFERENCE TO RELATED APPLICATION

This application is based upon and claims the benefit of priority of the prior Japanese Patent Application No. 2008-247165, filed on Sep. 26, 2008, the entire contents of which are incorporated herein by reference.

FIELD

An aspect of embodiments is related to a chromatic dispersion compensation design system and a chromatic dispersion compensation design method in an optical network.

BACKGROUND

In an optical network field, an optical network having a complex topology such as a ring cross connection or a mesh is being developed with an OADM (Optical Add-Drop Multiplexer) device allowing add-drop of an optical signal by wavelength, path switching or the like, or a WXC (Wavelength Cross Connect) device that is named as an optical hub.

Chromatic dispersion is one of factors determining transmission quality of an optical signal in an optical network. There is an attempt that a chromatic dispersion compensation device on an optical transmission path is arranged appropriately so that a residual dispersion value of an optional wavelength path transmitted on the optical network is included in a desired dispersion tolerance and a chromatic dispersion is compensated, in order to restrain a wavelength degradation of an optical signal because of the chromatic dispersion.

International Publication No. WO 2005/006604 A1 (hereinafter referred to as Document 1) discloses a technology where a dispersion compensation amount of a chromatic dispersion compensation device on each wavelength path is determined so that a residual chromatic dispersion at each terminal of a plurality of wavelength paths extracted from an optical network is included in an allowable range of a residual chromatic dispersion determined with respect to each wavelength path, as a chromatic dispersion compensation design method for a ring cross connection or a mesh network.

However, Document 1 does not disclose a concrete solving method how to select a combination of the dispersion compensation amount of each chromatic dispersion compensation device.

SUMMARY

According to an aspect of the present invention, there is provided a chromatic dispersion compensation design system including: an input unit that inputs information of an optical network having a plurality of nodes optically coupled to each other via an optical transmission path; an allowable range determining unit that determines an allowable range of a residual chromatic dispersion with respect to every wavelength path of a plurality of signals from a starting node to a terminal node, based on the information of the optical network; and a calculation unit that calculates a wavelength path capacity in the allowable range of the residual chromatic dispersion, in view of a chromatic dispersion variability of each optical element in the optical network.

According to another aspect of the present invention, there is provided a chromatic dispersion compensation design method including: inputting information of an optical network having a plurality of nodes optically coupled to each other via an optical transmission path; determining an allowable range of a residual chromatic dispersion with respect to every wavelength path of a plurality of signals from a starting node to a terminal node, based on the information of the optical network; and calculating a wavelength path capacity in the allowable range of the residual chromatic dispersion, in view of a chromatic dispersion variability of each optical element in the optical network.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

The following is a description of embodiments of the present invention, with reference to the accompanying drawings.

[a] First Embodiment

Figure 1:
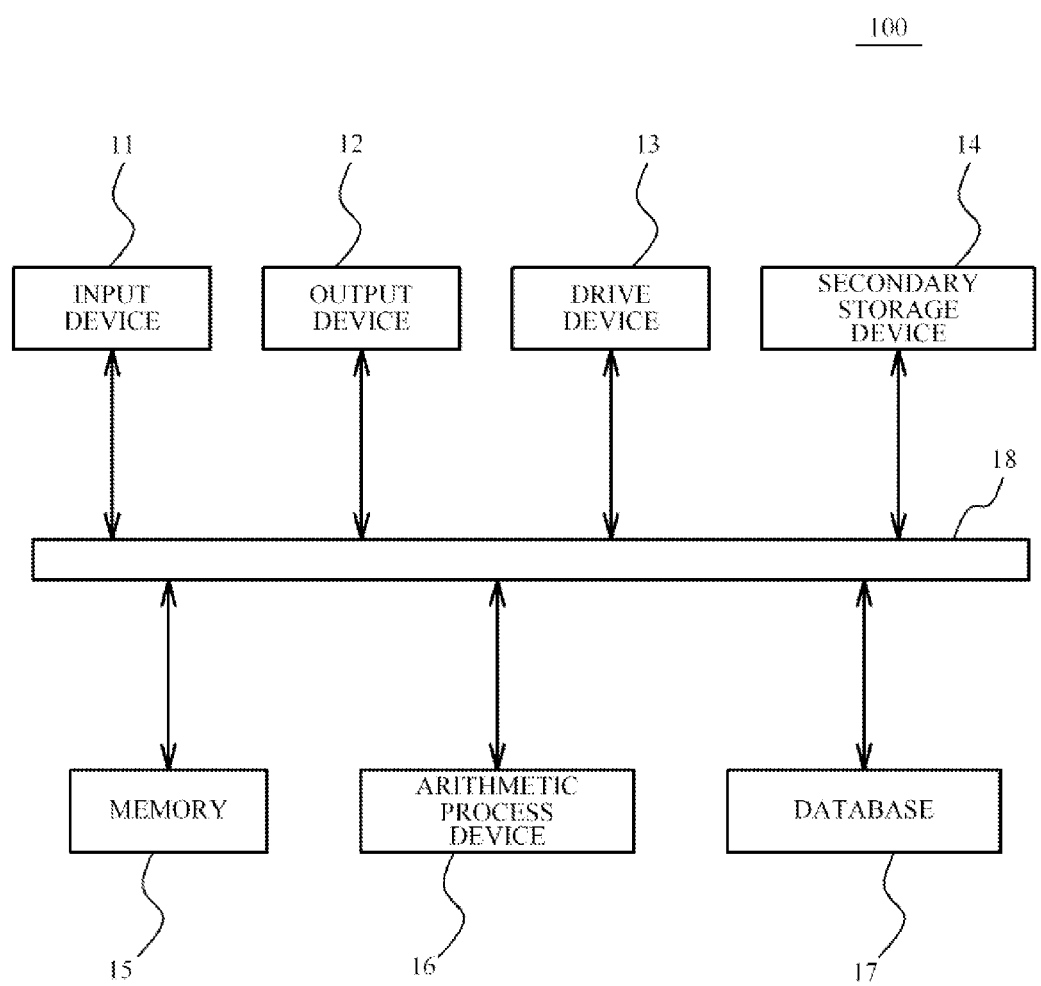
FIG. 1 illustrates a hardware structure of a chromatic dispersion compensation design system in accordance with a first embodiment.

FIG. 1 illustrates a hardware structure of a chromatic dispersion compensation design system 100 in accordance with a first embodiment. As illustrated in FIG. 1, the chromatic dispersion compensation design system 100 has an input unit 11, an output unit 12, a drive unit 13, a secondary storage unit 14, a memory 15, an arithmetic process unit 16 and a database 17. These elements are coupled to each other with a system bus 18. The chromatic dispersion compensation design system 100 may be a dedicated hardware or a computer such as a general personal computer or a workstation.

The input unit 11 is a keyboard, a mouse or the like. A user may input a various data with the input unit 11. The output unit 12 is such as a display device displaying information that is necessary for an operation of a program of the chromatic dispersion compensation design system 100, and operates in accordance with the program. The program is installed into the secondary storage unit 14 via the drive unit 13 or the like.

The arithmetic process unit 16 controls a processing of the chromatic dispersion compensation design system 100 based on the program that is read and stored by the memory 15. The arithmetic process unit 16 reads information necessary for an execution of the program from the database 17.

Figure 2:
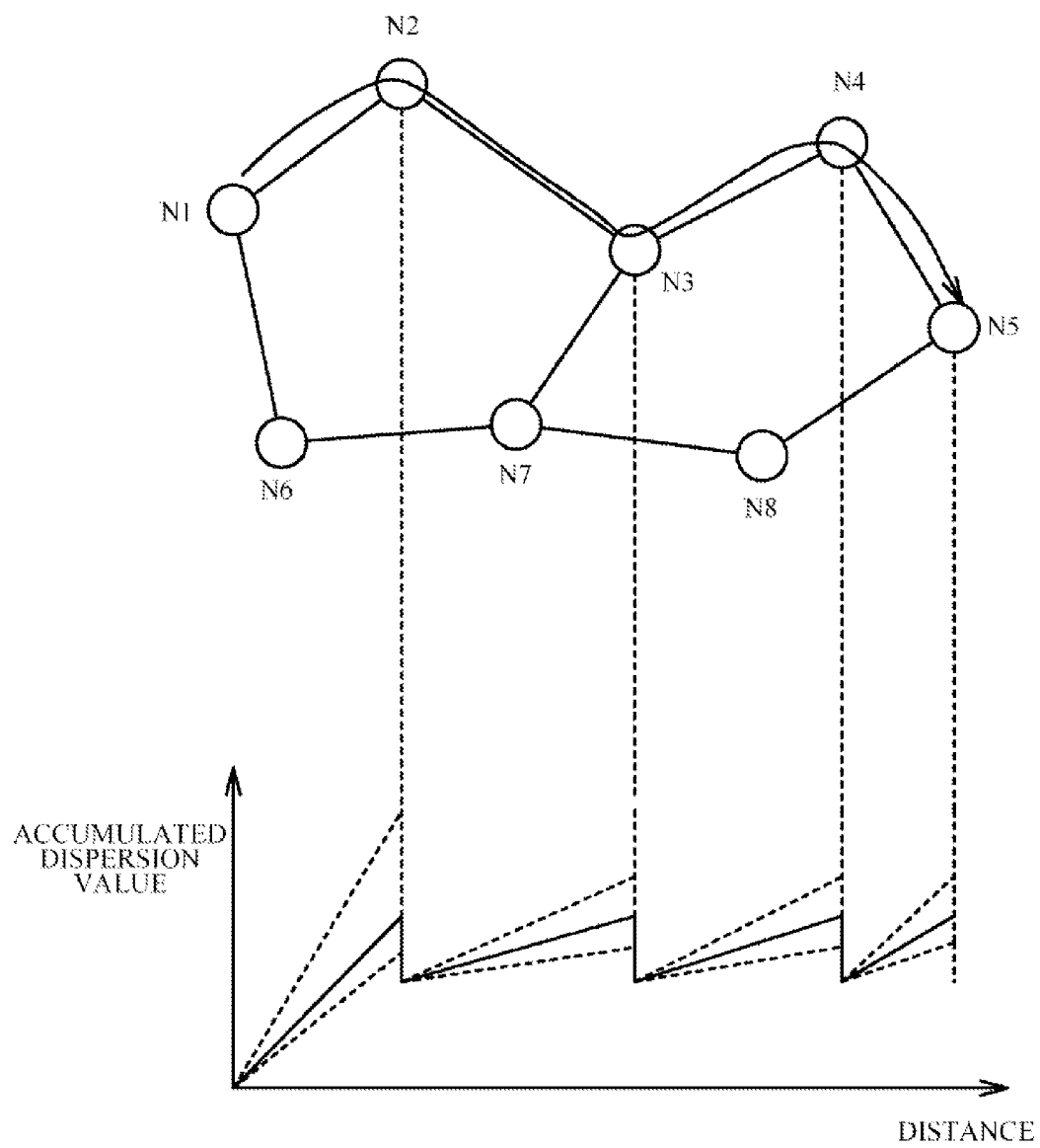
FIG. 2 illustrates a structure example of an optical network to which a chromatic dispersion compensation design system is adapted, and an example of a dispersion compensation map.

FIG. 2 illustrates a structure example of an optical network to which the chromatic dispersion compensation design system 100 is adapted, and an example of a dispersion compensation map of the optical network. The optical network illustrated on an upper side of FIG. 2 includes a plurality of nodes N1 through N8 coupled with an optical transmission path in a mesh form. Each of the nodes has a chromatic dispersion compensation device (DCM: Dispersion Compensation Module). A NMS (Network Management System) centrally controls operations of the nodes.

The dispersion compensation map illustrated on a lower side of FIG. 2 has a map example where a wavelength path starts from the node 1, goes through the nodes 2 through 4, and terminates at the node 5. The dispersion compensation map is optimally designed in accordance with the chromatic dispersion compensation method in accordance with the embodiment. Details of the optimized dispersion compensation map will be described later.

Figure 3:
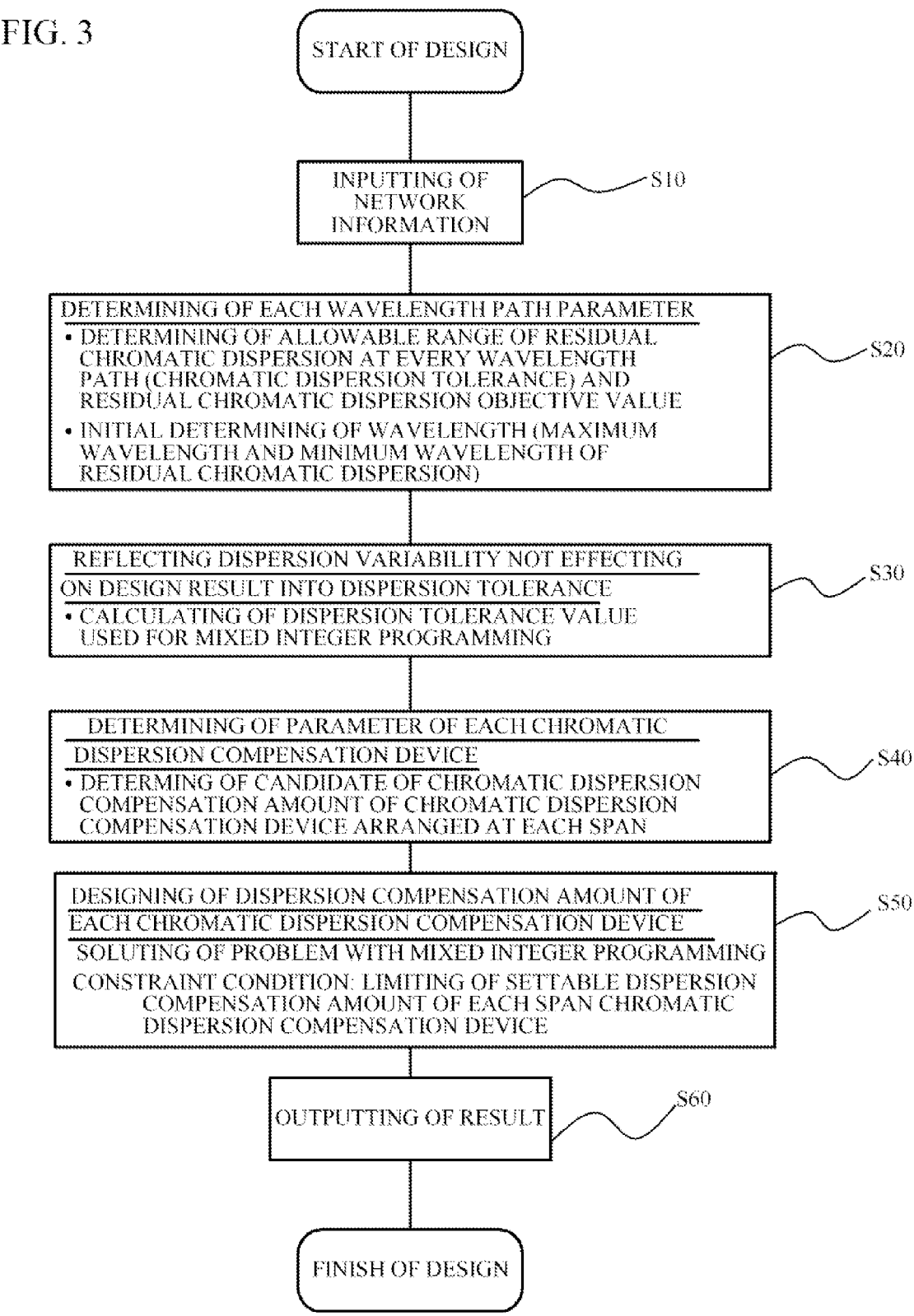
FIG. 3 illustrates a flowchart of an example of a processing executed by a chromatic dispersion compensation design system.

FIG. 3 illustrates a flowchart of an example of a process executed by the chromatic dispersion compensation design system 100. The chromatic dispersion compensation design system 100 inputs optical network information (Operation S10). The optical network information is input with the input unit 11. Next, the chromatic dispersion compensation design system 100 determines a parameter of each wavelength path (Operation S20). Then, the chromatic dispersion compensation design system 100 reflects a value of a dispersion variability having little effect on design result into a dispersion tolerance (an allowable range of a residual chromatic dispersion) (Operation S30).

Next, the chromatic dispersion compensation design system 100 determines a parameter of each of the DCMs (Operation S40). Then, the chromatic dispersion compensation design system 100 designs a dispersion compensation amount of each of the DCMs, and obtains a solution with a mixed integer programming (Operation S50). Then, the chromatic dispersion compensation design system 100 outputs a result (Operation S60). The output unit 12 outputs the result. After that, the chromatic dispersion compensation design system 100 terminates the flowchart.

A description will be given of details of process in each of the operations. In Operation S10, a user inputs the optical network information necessary for a design of the chromatic dispersion compensation amount, with respect to the optical network being a design object. The optical network information includes network topology information, node information, span information, wavelength path information, or chromatic dispersion variability value of a transmission device at each node and each span in the optical network.

In concrete, the network topology information includes an arrangement of each node on the optical network, information of coupling condition between each node, or the like. The node information includes a node type or a function of each node. A DCM is arranged at each node in the optical network illustrated in FIG. 2. Therefore, each node acts as a dispersion compensation node, in addition to an OADM node, an optical amplifier relay node and so on. Existence or nonexistence of dispersion compensation function of each node has only to be determined with the above-mentioned node information, because it is not essential that all of the nodes on the optical network have the dispersion compensation function.

The span information includes information regarding an optical fiber used in an optical transmission path (hereinafter referred to as a span) connecting between adjacent nodes. The span information includes a fiber type, a fiber length, a chromatic dispersion value, a transmission loss and so on.

The wavelength path information includes path information, a signal type (such as 2.4 Gbps, 10 Gbps, 40 Gbps or 100 Gbps), wavelength information, output power information of an optical signal from each node or the like of each optical signal transmitted on the optical network. A single wavelength path includes an optical signal having one or more wavelengths transmitted on a single path. A representative standard wavelength of an optical signal transmitted on each wavelength path is used, when parameters described later are determined with respect to a plurality of wavelength paths determined on the optical network. A central wavelength of a signal wavelength band may be determined in advance with respect to the standard wavelength.

The optical network information in accordance with the embodiment may be limited to the concrete example mentioned above. The optical network information has only to be related to each parameter used in arithmetic processing of a chromatic dispersion compensation design described later.

In Operation S20, a chromatic dispersion tolerance at a terminal node of each wavelength path and a residual chromatic dispersion objective value at a terminal node of each wavelength path are determined as a parameter of each wavelength path necessary for the chromatic dispersion compensation design, based on the optical network information that is input in Operation S10.

In concrete, the chromatic dispersion tolerance is calculated based on path information of each wavelength path, node information along the path, fiber information between nodes on the path, a signal type of an optical signal transmitted on each wavelength path, output power information of an optical signal from each node or the like. The residual chromatic dispersion objective value is determined newly as a design objective value of residual chromatic dispersion, in the above-mentioned chromatic dispersion tolerance. The residual chromatic dispersion objective value is preferably determined in a center range except for an upper limit and a lower limit of the chromatic dispersion tolerance, and is more preferably determined at a center between the upper limit and the lower limit of the chromatic dispersion tolerance.

The dispersion tolerance value used for the mixed integer programming is calculated in Operation S30. Here, each device actually has a given dispersion variability, although the residual dispersion is calculated based on a performance specification dispersion value of each device (a DCM, a fiber or the like).

The dispersion variability value has two main elements (devUpper and devLower). "Upper" indicates a plus side value, and "Lower" indicates a minus side value.

One of the two elements is a constant variability such as a fiber dispersion variability that is unaffected by a designed structure. In the embodiment, a plus side value of the variability is expressed as $ConstUpperDev(d, \lambda)$, and a minus side value of the variability is expressed as $ConstLowerDev(d, \lambda)$. The other of the two elements is a changeable variability such as a DCM dispersion variability that is affected by the designed structure. In the embodiment, a plus side value of the variability is expressed as $VarUpperDev(d, \lambda, DCM)$, and a minus side value of the variability is expressed as $VarLowerDev(d, \lambda, DCM)$. The above "d" indicates a demand (wavelength path).

Figure 4:
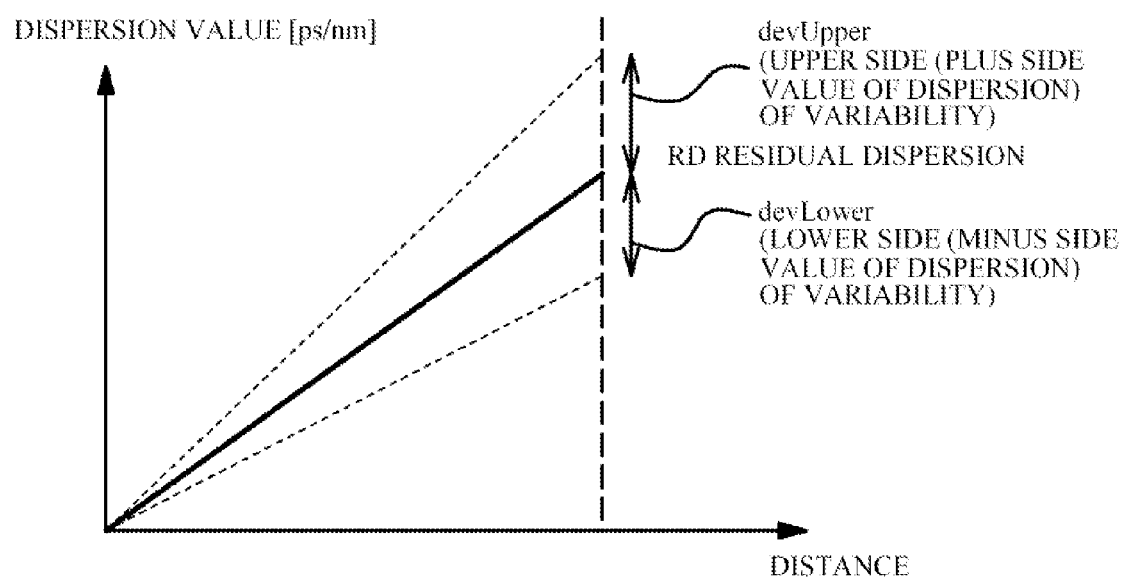
FIG. 4 illustrates a plus side value of a dispersion variability and a minus side value of the dispersion variability.

As illustrated in FIG. 4, a plus side value of the dispersion variability is expressed as $devUpper(d, \lambda, DCM)$, and a minus side value of the dispersion variability is expressed as $devLower(d, \lambda, DCM)$. In this case, a following expression (1) is obtained.

$$devUpper(d,\lambda,DCM) = ConstUpperDev(d,\lambda) + VarUpperDev(d,\lambda,DCM)$$

$$devLower(d,\lambda,DCM) = ConstLowerDev(d,\lambda) + VarLowerDev(d,\lambda,DCM) \quad \text{(Expression 1)}$$

In Operation S40, a candidate of chromatic dispersion compensation amount is determined with respect to the DCM arranged at each span. For example, a residual dispersion objective value of all wavelength paths at spans having the DCM where the all wavelength paths pass through is considered. Thus, a dispersion compensation amount having all of the residual dispersion objective values is selected as the candidate. A method obtaining the candidate of the chromatic dispersion compensation amount is not limited to the above-mentioned method.

In Operation S50, chromatic dispersion compensation amount of the DCM at each span is determined with the parameter obtained in Operation S10 through S40. The mixed integer programming that is one of linear programming methods is adapted in order to obtain an optimal solution. A constraint condition of the mixed integer programming is determined as follows.

[Constraint Condition]

(1) The chromatic dispersion compensation amount that may be determined at the DCM of each span is the candidate of the chromatic dispersion compensation amount obtained in Operation S50.

(2) A flag "y" is set to be "1", when a range of the residual dispersion reflecting such as the wavelength dependence or the dispersion variability is out of the dispersion tolerance on each wavelength path in the network. The flag "y" is a Boolean parameter and is set at each wavelength path.

A following expression (2) is obtained with respect to wavelengths λ1 through λn that are a calculation objective, if the above-mentioned constraint condition is expressed. A plus side value of a dispersion tolerance is expressed as UpperTolerance[d, λ], and a minus side value of a dispersion tolerance is expressed as LowerTolerance[d, λ]. "y1" indicates a plus side value of a dispersion tolerance, and "y2" indicates a minus side value of a dispersion tolerance.

$$\left\{\begin{array}{l} RD[d, \lambda_1, DCM] - \\ devLower[d, \lambda_1, DCM] < \\ LowerTolerance[d, \lambda_1] \\ \text{or} \\ \vdots \\ \text{or} \\ RD[d, \lambda_n, DCM] - \\ devLower[d, \lambda_n, DCM] < \\ LowerTolerance[d, \lambda_n] \end{array}\right\} \Leftrightarrow \frac{y1[d] = 1}{\text{NOT TRANSMITTABLE}} \quad \text{(Expression 2)}$$

$$\left\{\begin{array}{l} RD[d, \lambda_1, DCM] > \\ UpperTolerance[d, \lambda_1, DCM] - \\ devUpper[d, \lambda_1] \\ \text{or} \\ \vdots \\ \text{or} \\ RD[d, \lambda_n, DCM] > \\ UpperTolerance[d, \lambda_n, DCM] - \\ devUpper[d, \lambda_n] \end{array}\right\} \Leftrightarrow y2[d] = 1$$

$$y1[d] = 1 \text{ or } y2[d] = 1 \Leftrightarrow y[d] = 1$$

The constraint condition may be transformed to a following expression (3), if the expression (1) is substituted into the expression (2).

$$\left\{\begin{array}{l} RD[d, \lambda_1, DCM] - \\ VarLowerDev[d, \lambda_1, DCM] < \\ LowerTolerance[d, \lambda_1] + \\ ConstLowerDev(d, \lambda_1) \\ \text{or} \\ \vdots \\ \text{or} \\ RD[d, \lambda_n, DCM] - \\ VarLowerDev[d, \lambda_n, DCM] < \\ LowerTolerance[d, \lambda_n] + \\ ConstLowerDev(d, \lambda_n) \end{array}\right\} \Leftrightarrow y1[d] = 1 \quad \text{(Expression 3)}$$

$$\left\{\begin{array}{l} RD[d, \lambda_1, DCM] + \\ VarUpperDev[d, \lambda_1, DCM] < \\ UpperTolerance[d, \lambda_1] - \\ ConstLowerDev(d, \lambda_1) \\ \text{or} \\ \vdots \\ \text{or} \\ RD[d, \lambda_n, DCM] + \\ VarUpperDev[d, \lambda_n, DCM] < \\ UpperTolerance[d, \lambda_n] - \\ ConstLowerDev(d, \lambda_n) \end{array}\right\} \Leftrightarrow y2[d] = 1$$

$$y1[d] = 1 \text{ or } y2[d] = 1 \Leftrightarrow y[d] = 1$$

An intended wavelength path does not allow transmission, if y[d]=1 of the expression (3). Here, it is preferable that the wavelength path not allowing the transmission is small in number. That is, it is preferable that a total sum of y[d] at each wavelength path is fewer.

A number of failure at each wavelength path may be a minimum if the total sum of y[d] is minimum. In this case, a number of succeeding may be a maximum.

With the chromatic dispersion compensation design system in accordance with the embodiment, an objective function is direct. It is therefore possible to calculate an optimal solution of chromatic dispersion compensation securing transmission quality with respect to a wavelength path of an optical network.

The output unit 12 displays information of process for obtaining a solution of the expression (3). For example, the output unit 12 may display a condition of a path, a processing time for obtaining a solution, accuracy of a solution with respect to an ideal solution, a half result of a calculation, and so on.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:

1. A chromatic dispersion compensation design system comprising:
an input unit that inputs information of an optical network having a plurality of nodes optically coupled to each other via an optical transmission path and a plurality of chromatic dispersion compensation device provided in each of the nodes;
an allowable range determining unit that determines an allowable range of a residual chromatic dispersion with respect to every wavelength path of a plurality of signals from a starting node to a terminal node, based on the information of the optical network; and
a calculation unit that calculates a number of a wavelength path in the allowable range of the residual chromatic dispersion based on candidates of dispersion compensation amount for each chromatic dispersion compensation device in view of the information inputted from the input unit and calculates an optimal amount of dispersion compensation based on the number of wavelength path in the allowable range.

2. The chromatic dispersion compensation design system as claimed in claim 1, wherein the information of the optical network includes wavelength path information and determined dispersion variability information of an optical element.

3. The chromatic dispersion compensation design system as claimed in claim 1 wherein the calculation unit calculates dispersion compensation amount of the chromatic dispersion compensation device so that the number of wavelength path in the allowable range of the residual chromatic dispersion is a maximum.

4. The chromatic dispersion compensation design system as claimed in claim 3 further comprising an arithmetic process unit that reflects a chromatic dispersion variability that is unaffected by an arithmetic processing into a part of the allowable range of the residual chromatic dispersion before the arithmetic processing.

5. The chromatic dispersion compensation design system as claimed in claim 1 further comprising a display device that displays information of process of obtaining a solution with the calculation unit.

6. A chromatic dispersion compensation design method comprising:
inputting information of an optical network having a plurality of nodes optically coupled to each other via an optical transmission path and a plurality of chromatic dispersion compensation device provided in each of the nodes;
determining an allowable range of a residual chromatic dispersion with respect to every wavelength path of a plurality of signals from a starting node to a terminal node, based on the information of the optical network;
setting candidates of dispersion compensation amount of the chromatic dispersion compensation device; and
calculating a number of a wavelength path in the allowable range of the residual chromatic dispersion based on candidates of dispersion compensation amount for each chromatic dispersion compensation device in view of the information inputted from the input unit and calculating an optimal amount of dispersion compensation based on the number of wavelength path in the allowable range.

7. The chromatic dispersion compensation design method as claimed in claim 6, wherein the information of the optical network includes wavelength path information and determined dispersion variability information of an optical element.

8. The chromatic dispersion compensation design method as claimed in claim 6 wherein the dispersion compensation amount of the chromatic dispersion compensation device is calculated so that the number of wavelength path in the allowable range of the residual chromatic dispersion is a maximum.

9. The chromatic dispersion compensation design method as claimed in claim 8 further comprising reflecting a chromatic dispersion variability that is unaffected by an arithmetic processing into a part of the allowable range of the residual chromatic dispersion before the arithmetic processing, in the performing of the arithmetic processing.

10. The chromatic dispersion compensation design method as claimed in claim 6 further comprising displaying information of process of obtaining a solution in the calculating of the number of wavelength path.

* * * * *